United States Patent
Uematsu et al.

[11] Patent Number: 6,098,398
[45] Date of Patent: Aug. 8, 2000

[54] LOW TEMPERATURE HYDROGEN COMBUSTION TURBINE

[75] Inventors: Kazuo Uematsu; Hidetaka Mori; Hideaki Sugishita, all of Takasago, Japan; Herbert Jericha, Graz, Austria

[73] Assignee: Mitsubishi Heavy Industries, Ltd., Tokyo, Japan

[21] Appl. No.: 09/031,679

[22] Filed: Feb. 27, 1998

[51] Int. Cl.[7] .............................. F02C 3/22; F02C 6/18
[52] U.S. Cl. ................................. 60/39.182; 60/39.465
[58] Field of Search ...................... 60/39.181, 39.465, 60/39.54, 39.182

[56] References Cited

U.S. PATENT DOCUMENTS 5,687,559 11/1997 Sato .
5,775,091 7/1998 Bannister et al. .................. 60/39.465

FOREIGN PATENT DOCUMENTS 7208192 8/1995 Japan .
9731184A1 8/1997 WIPO .

OTHER PUBLICATIONS

Patent Abstracts of Japan—Abstract for JP 07–208192 A, published Aug. 5, 1995, Uematsu et al.

Patent Abstracts of Japan—Abstract for JP 09–151750 A—published Jun. 10, 1997—Uematsu et al.

*Primary Examiner*—Louis J. Casaregola

[57] ABSTRACT

In a hydrogen combustion turbine plant employing a topping bleed cycle, a low temperature hydrogen combustion turbine bleeds part of exhaust from a third turbine to cool a first turbine, thereby achieving a high efficiency in a desired temperature range while curtailing a cost increase without involving the addition of accessory instruments.

4 Claims, 4 Drawing Sheets

LOW TEMPERATURE HYDROGEN COMBUSTION TURBINE

BACKGROUND OF THE INVENTION

This invention relates to a hydrogen combustion turbine plant with a topping bleed cycle.

A hydrogen combustion turbine plant with a topping bleed cycle is publicly known as disclosed, for example, in Japanese Unexamined Patent Publication No. 208192/95. A typical system diagram of a conventional topping bleed cycle is shown in FIG. 3.

The numeral 1 denotes a compressor, 2 a combustor, 3 a first turbine, 4, 5 regenerative heat exchangers, 6 a second turbine, 7 a condenser, 8 a third turbine, and 9, 10 feed water heaters.

A gas compressed by the compressor 1 is fed to the combustor 2, where it is mixed with $O_2$ and $H_2$ supplied. The mixture is combusted and heated there to form a hot combustion gas (steam) to drive the first turbine 3. Excess steam generated by combustion in this cycle heats feed water in the regenerative heat exchangers 4, 5 located downstream of the first turbine 3. Then, part of the excess steam is drawn again into the compressor 1.

The remainder of the excess steam is supplied to the second turbine 6, and the steam that has driven the second turbine 6 is condensed by the condenser 7 to form condensate. The condensate is heated by the feed water heater 9, regenerative heat exchanger 5 and regenerative heat exchanger 4 in this order to form steam. This steam drives the third turbine 8, and the resulting exhaust is returned to the combustor 2.

An attempt was made to further increase the efficiency of a system with the foregoing topping bleed cycle. That is, the inlet temperature of the high temperature first turbine was raised, and an intercooler and regenerative heat exchangers were added in response to the associated high temperature of various parts. Through this contrivance, it was attempted to maintain the materials within the serviceable temperature range, thereby achieving practical use of the system.

This is a topping regeneration cycle (intercooling) system as shown in FIG. 4. The system of FIG. 4 is characterized by the provision of an intercooler 13 and the addition of regenerative heat exchangers 11, 12 in comparison with the topping bleed cycle system illustrated in FIG. 3.

With the above-described topping bleed cycle system illustrated in FIG. 3, the gas temperature was limited because of the cycle configuration and the level of heat resistance of the respective instruments. Thus, this system was not entirely satisfactory in terms of efficiency.

According to the topping regeneration cycle (intercooling) system as shown in FIG. 4, the inlet temperature of the high temperature first turbine was raised for increased efficiency. In response to the associated heat elevation of various parts, the intercooler and regenerative heat exchangers were added to prevent temperatures from exceeding the serviceable temperature range of the materials. Increases in the expenses for additional equipment as well as in the materials cost were inevitable for this purpose, precluding practical use of this system.

SUMMARY OF THE INVENTION

The present invention has been accomplished to solve these problems with earlier technologies. Its object is to provide a novel topping bleed cycle system whose entire structure is compact for decreased cost, and which functions efficiently.

The present invention for attaining this object provides a low temperature hydrogen combustion turbine in a topping bleed cycle of a hydrogen combustion turbine plant, which includes a device for bleeding part of exhaust from a third turbine to cool a first turbine. By performing cooling of the first turbine with part of exhaust bled from the third turbine, the invention enables cooling while minimizing a decrease in the efficiency, thus making it possible to lower the temperatures of the respective parts of the first turbine further.

DETAILED DESCRIPTION OF THE PREFERRED EMBODIMENTS

Figure 1:
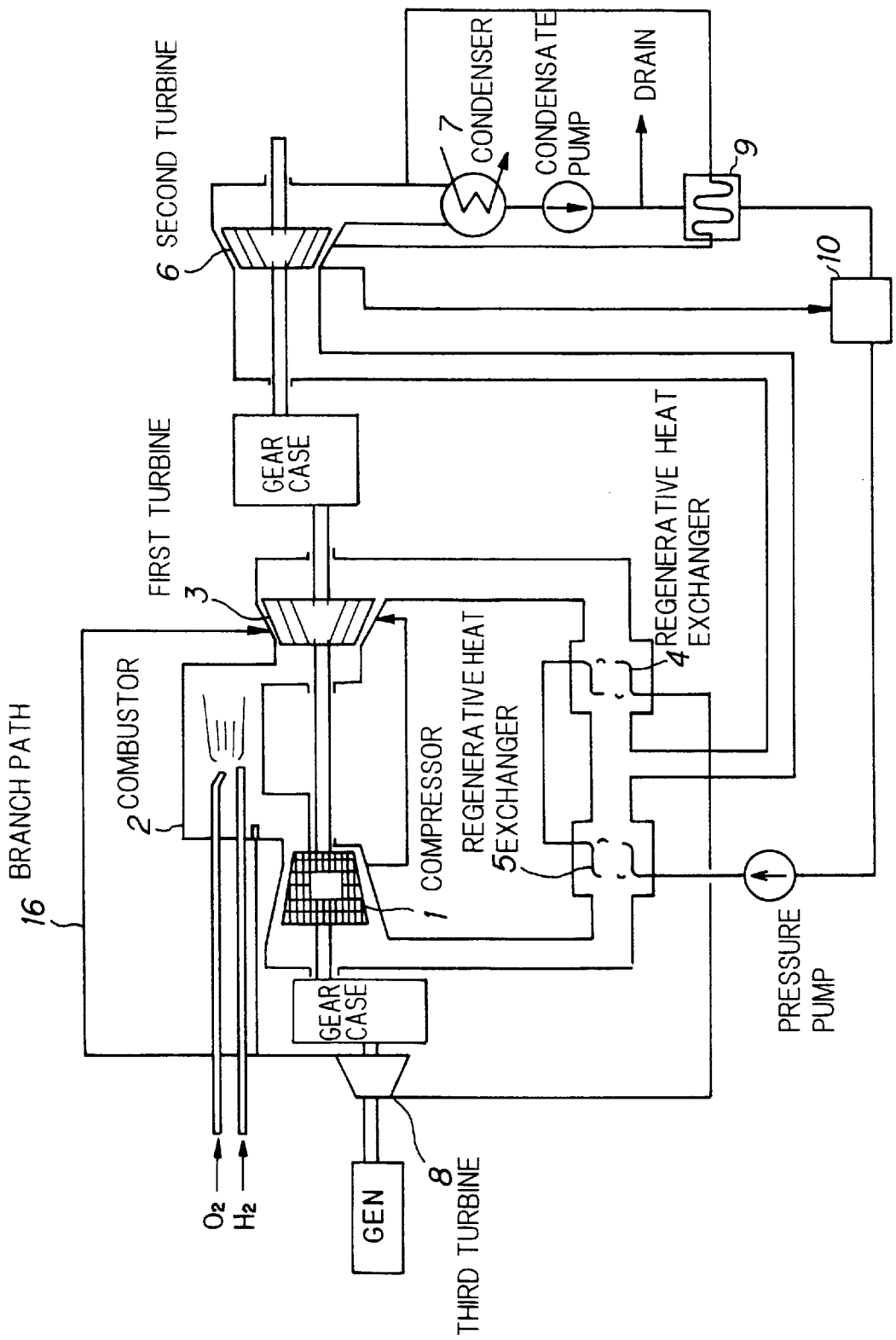
FIG. 1 is a system diagram of a low temperature bleeding cycle concerned with an embodiment of the present invention.

An embodiment of the present invention will now be described with reference to FIGS. 1 and 2. The same parts as described in the conventional system are assigned the same numerals, and an overlapping explanation is omitted.

This embodiment includes, in addition to the structure of the aforementioned conventional topping bleed cycle, a new branch path 16 branched from the passage through which the exhaust from the third turbine 8 is supplied to the combustor 2. The branch path 16 communicates with the first turbine 3 so that part of the exhaust will cool the respective parts of the first turbine 3.

The pressure of steam that enters the third turbine 8 through the regenerative heat exchanger 5 beforehand is not at the level of 140 bars used with this type of conventional cycle, but should desirably be 200 bars or higher. Because of this increased pressure, the task in the third turbine 8 is performed under high pressure, thereby increasing the amount of work for the third turbine 8 to produce a high efficiency.

Figure 2:
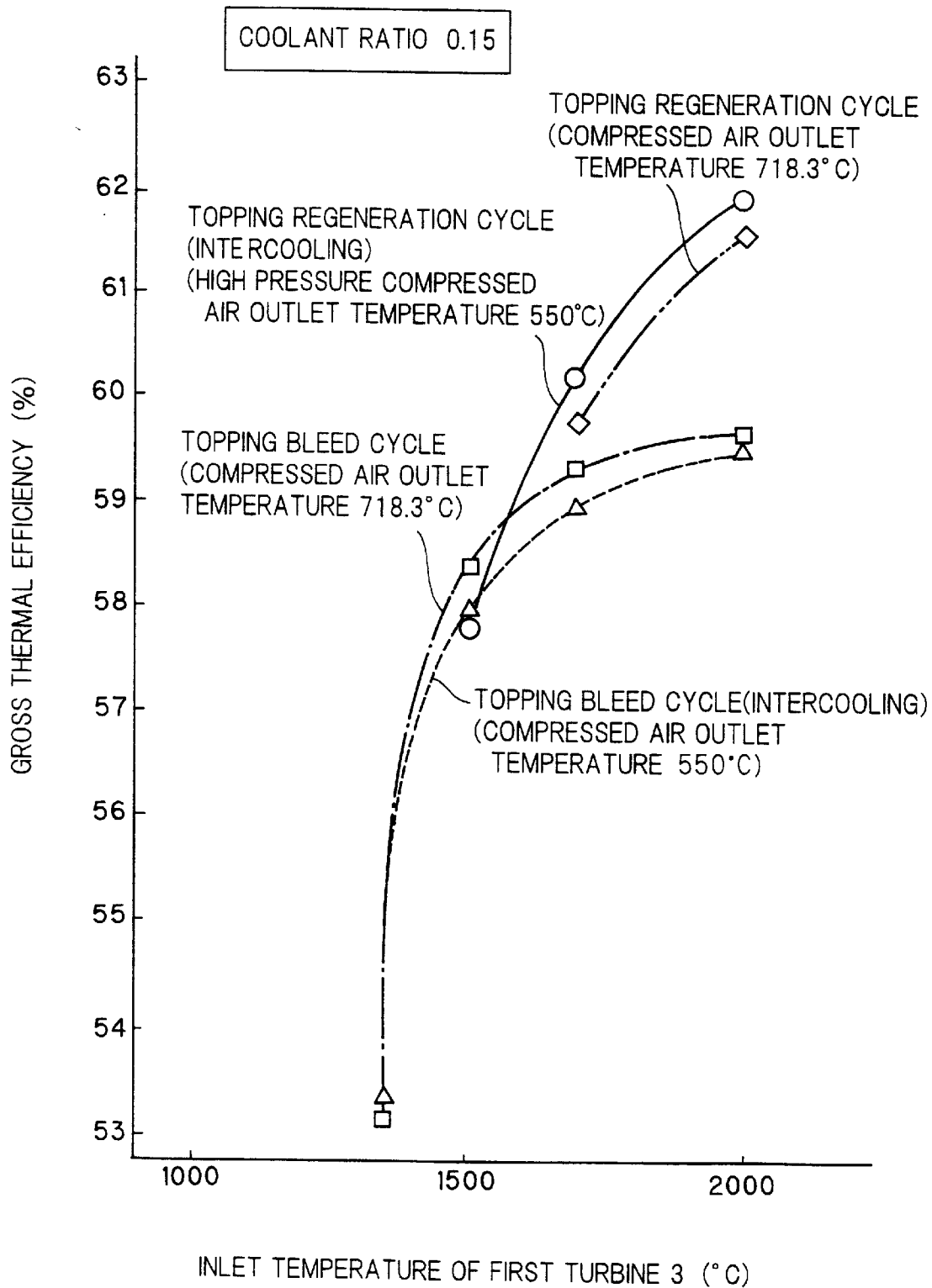
FIG. 2 is an efficiency comparative view showing a comparison between the system of FIG. 1 and a conventional system.
Figure 3:
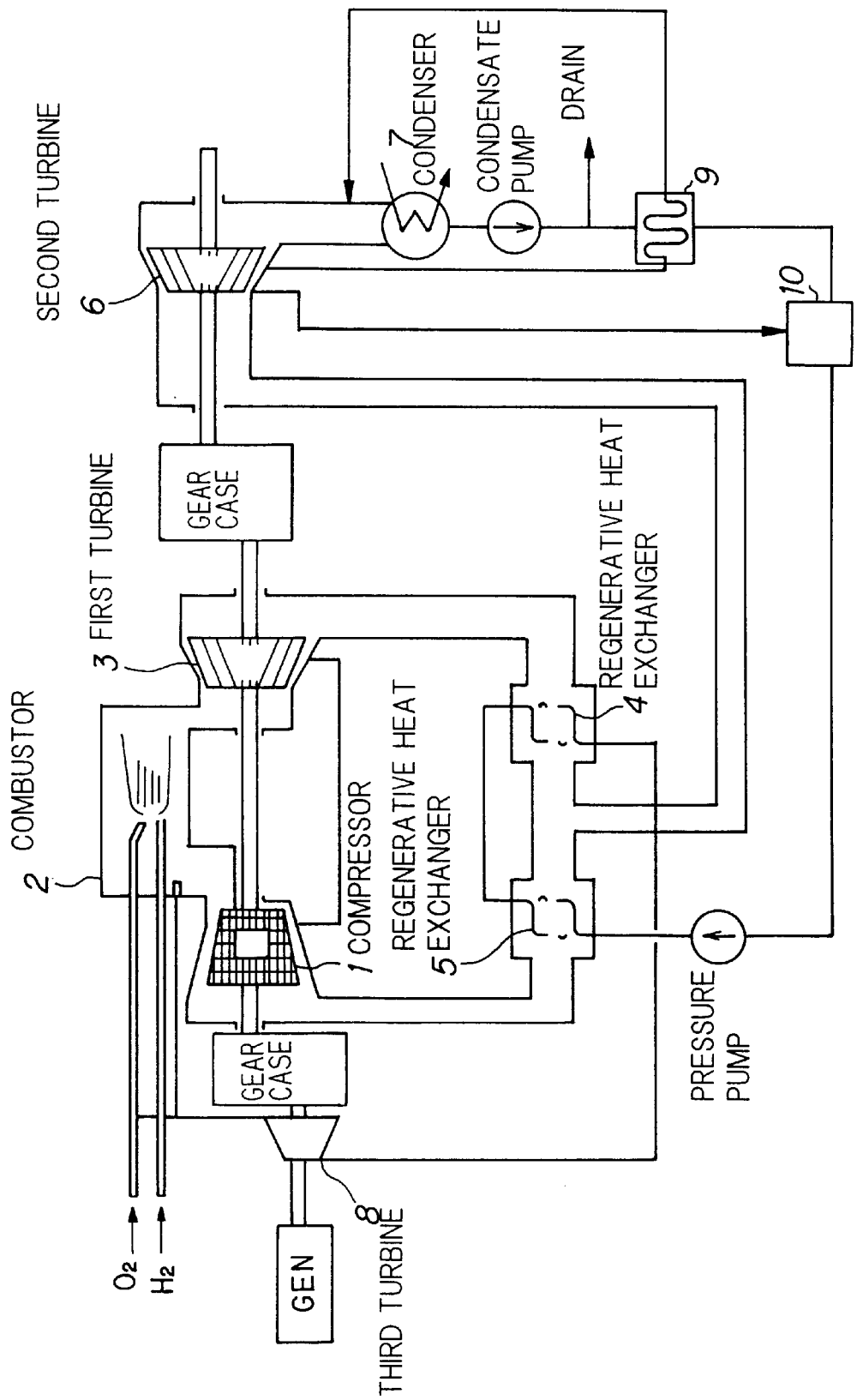
FIG. 3 is a system diagram of a conventional bleeding cycle.
Figure 4:
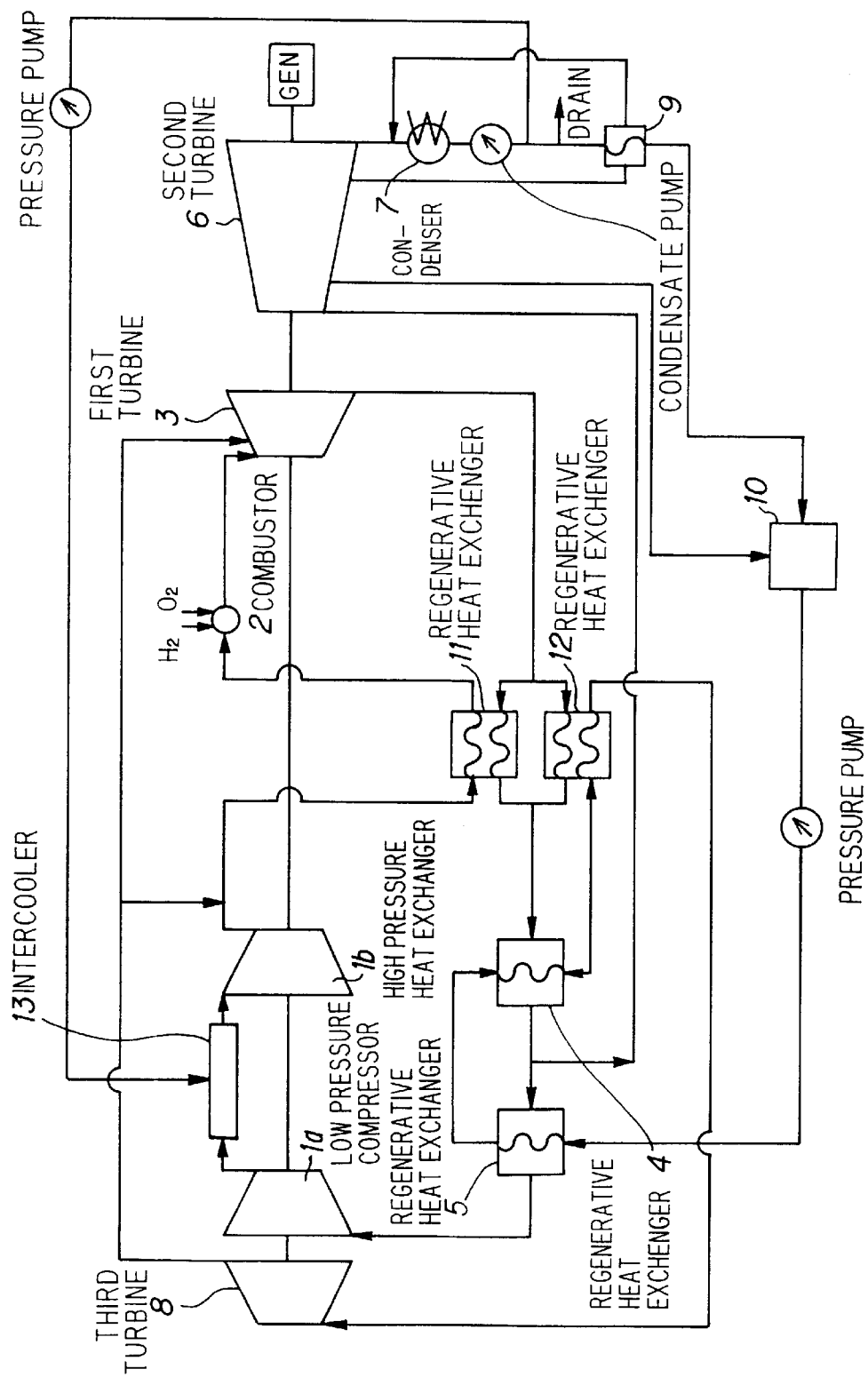
FIG. 4 is a system diagram of a conventional regeneration cycle.

The gross thermal efficiency of the above-configured embodiment of the invention is shown in FIG. 2 in comparison with the efficiency of the topping regeneration cycle. The system illustrated here has a coolant ratio of 0.15.

The coolant ratio is 0 for an ideal blade which does not require blade cooling. A high temperature blade, on the other hand, necessarily requires cooling. Normally, its coolant ratio is generally about 0.15 (15%).

When the inlet temperature of the first turbine 3 is raised to about 1,600° C. or higher on this precondition, a conventional topping regeneration cycle having an intercooler and regenerative heat exchangers added thereto can achieve a higher efficiency. Below about 1,600° C., however, the topping bleed cycle of the instant embodiment is found more efficient.

Since the outlet temperature of the compressor 1 is related to pressure ratio, an intercooler is effective for lowering this temperature. For the outlet temperature of the first turbine 3, it is necessary to decrease the inlet temperature of the first turbine 3. Under the restricted condition that the inlet temperature of the first turbine be 1,600° C. or less, at the lowest, the efficiency can be maintained at a high value, so that the topping bleed cycle of the instant embodiment is effective.

According to this embodiment, the cooling of the first turbine 3 is performed by branching part of the exhaust from the third turbine 8. Thus, the steam generated by combustion in the combustor 2 is not discarded halfway through the cycle, but is utilized for work to the last. This leads to improved efficiency.

As for the pressure of steam entering the third turbine 3, an ordinary topping bleed cycle begins to use a critical pressure of about 140 bars, a general combined cycle a critical pressure of about 160 bars, and a general steam turbine a critical pressure of 250 bars or more. Thus, various conditions are set so as to produce a pressure of 200 bars or higher, thereby making the work in the third turbine 8 work done under high pressure. Consequently, the amount of work increases, whereby a high efficiency can be imparted to the entire cycle.

As noted above, according to the present invention, a higher efficiency than in a topping regeneration cycle can be retained when the inlet temperature of the first turbine is 1,600° C. or below, at the lowest. Under the restricted condition, i.e., 1,600° C. or lower, highly efficient operation becomes possible without requiring the addition of an intercooler and regenerative heat exchangers. Thus, the invention has succeeded in obtaining a low temperature hydrogen combustion turbine for which the expenses for additional equipment can be cut, and the costs for the materials can be reduced.

While the present invention has been described with reference to the illustrated embodiment, it is to be understood that the invention is not restricted thereby, but various changes and modifications may be made in the concrete structure of the invention without departing from the spirit and scope of the invention.

We claim:

1. A hydrogen combustion turbine plant, comprising:
   a compressor adapted to compress a gas to generate a compressed gas;
   a combustor adapted to mix the compressed gases with $O_2$ and $H_2$ gasses fed to the combustor, and burning and heating the mixture to form a high temperature combustion gas;
   a first turbine driven by the combustion gas;
   a channel adapted to supply a first exhaust gas from said first turbine to said compressor;
   a second turbine driven by the first exhaust gas partly bled from said channel;
   a third turbine driven by steam, said steam being provided by condensing a second exhaust gas from said second turbine and subsequently evaporating the condensate in at least one heat exchanger provided in said channel; and
   a cooling unit adapted to provide at least a part of a third exhaust gas from said third turbine to said first turbine to cool said first turbine.

2. A hydrogen combustion turbine plant of claim 1, wherein the hydrogen combustion turbine plant is operated at a temperature of 1600° C. or lower.

3. A hydrogen combustion turbine plant of claim 1, wherein said cooling unit is a branch path that provides said first turbine with said part of the third exhaust gas from said third turbine.

4. A hydrogen combustion turbine plant of claim 3, wherein said branch path directly provides said third exhaust from said third turbine directly to said first turbine.

* * * * *